(12) United States Patent
Eguchi (10) Patent No.: US 7,881,609 B2
(45) Date of Patent: Feb. 1, 2011

(54) OPTICAL ACCESS SYSTEM AND RANGING METHOD FOR OPTICAL ACCESS SYSTEM

(75) Inventor: Kohei Eguchi, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 636 days.

(21) Appl. No.: 12/003,171

(22) Filed: Dec. 20, 2007

(65) Prior Publication Data
US 2008/0267624 A1    Oct. 30, 2008

(30) Foreign Application Priority Data
Apr. 27, 2007    (JP) .............................. 2007-119582

(51) Int. Cl.
*H04B 10/00* (2006.01)
(52) U.S. Cl. .............................. 398/25; 398/67; 398/154
(58) Field of Classification Search ............. 398/25–38, 398/66–72, 154
See application file for complete search history.

(56) References Cited
PUBLICATIONS

"ITU-T Recommendation" issued by International Telecommunications Union, Jan. 2005, p. 72, Figure 25; G.0983.1—Configuration of the specification points.

*Primary Examiner*—Agustin Bello
(74) *Attorney, Agent, or Firm*—Rabin & Berdo, P.C.

(57) ABSTRACT

A ranging signal R1 generated by a signal generator and reaches to a signal checker via a working system transmission line, a loop circuit, and an auxiliary system transmission line. The signal checker measures a delay time from the generation to the arrival of the signal R1. A ranging signal R2 generated by the signal generator and reaches to a signal checker via an auxiliary system transmission line, a loop circuit, and an auxiliary system transmission line. The signal checker measures a delay time from the generation to the arrival of the signal R12. A delay time of the working system transmission line is calculated from the delay times of the signals R1 and R2. Disruption of the services provided by the other ONUs can be prevented since the working system transmission line is not used for upstream communication of the ranging signals R1 and R2.

5 Claims, 7 Drawing Sheets

RELATED ART

FIG. 5A

RELATED ART

FIG. 5B

RELATED ART

FIG. 6

RELATED ART

OPTICAL ACCESS SYSTEM AND RANGING METHOD FOR OPTICAL ACCESS SYSTEM

CROSS-REFERENCE TO RELATED APPLICATION

This application claims priority under 35 USC 119 from Japanese Patent Application No. 2007-119582, the disclosure of which is incorporated by reference herein.

BACKGROUND OF THE INVENTION

1. Field of the Invention

The present invention relates to an improvement of a ranging function provided in a redundant optical access system. The invention is applicable to a redundant optical access system for constructing an access system such as a PON (Passive Optical Network) and the like.

2. Description of the Related Art

Hitherto, FTTx (Fiber To The x) has been known as an optical access network for providing communication services such as Internet, IP (Internet Protocol) telephone, distribution of video and the like. As the FTTx, there have been known FTTH (Fiber To The Home), FTTC (Fiber To The Curb), FTTN (Fiber To The Node), FTTP (Fiber To The Premises) and the like for example.

The PON is also known as a subscriber access technology for realizing the FTTx at low cost. As the PON, there have been known ATM-PON (Asynchronous Transfer Mode-PON: technology standardized by ITU-T G.983.1 and G983.2), B-PON (Broadband-PON: technology standardized by ITU-T G.983.3), G-PON (Gigabit-PON: technology standardized by ITU-T G.984) and GE-PON (Gigabit Ethernet (Registered Mark)-PON: technology standardized by IEEE802.3ah).

Figure 3:
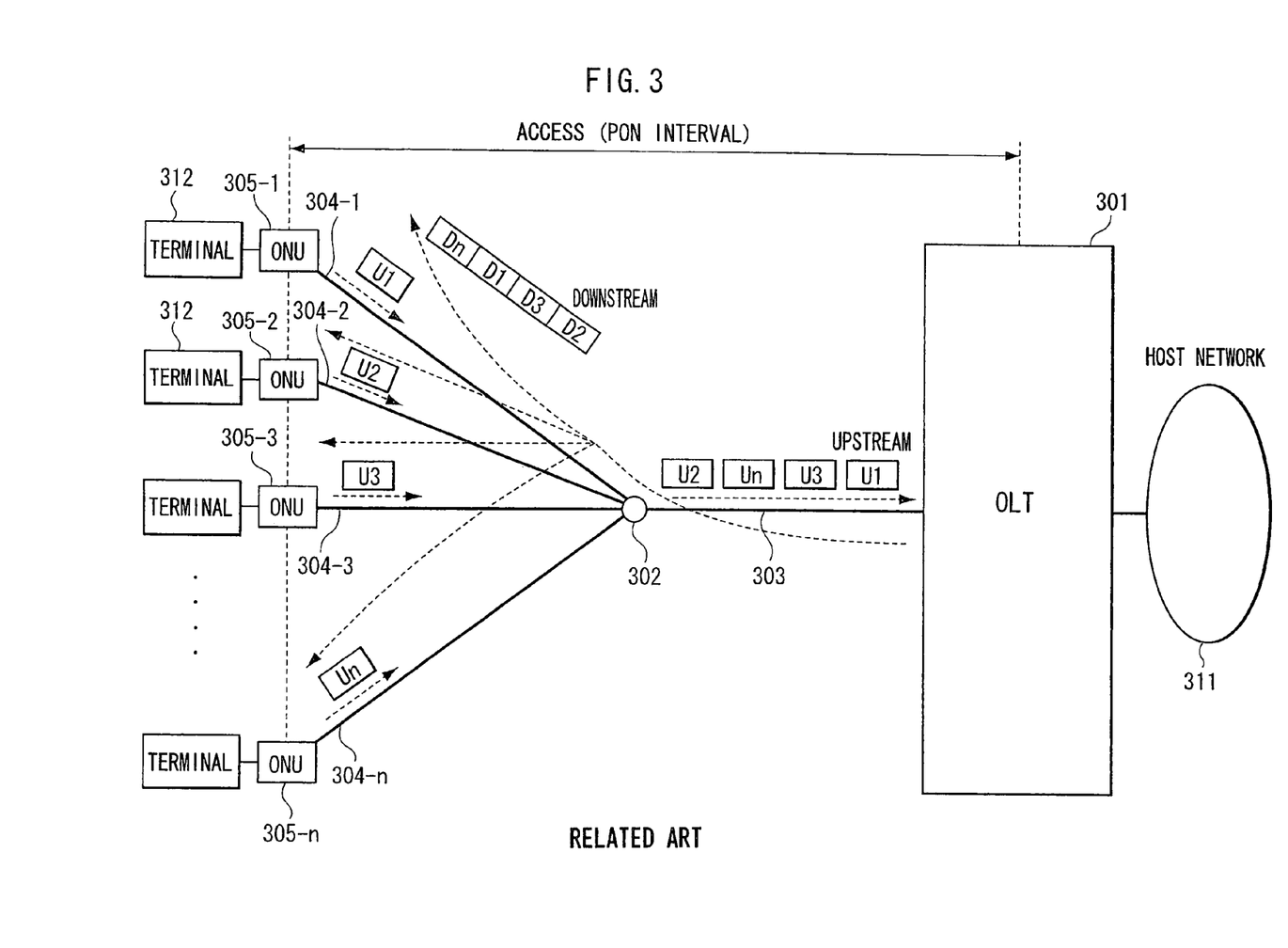
FIG. 3 is a conceptual diagram showing a topology of the PON.

FIG. 3 is a conceptual diagram showing a topology of the PON. As shown in FIG. 3, an OLT (Optical Line Terminal: subscriber station unit) 301 accommodates n ONUs (Optical Network Unit: optical line terminal unit) 305-1, ..., 305-n via a splitter 302 and optical fibers 303 and 304-1, ..., 304-n. The OLT 301 and the ONUs 305-1, ..., 305-n use different frequencies for downstream and upstream communications. Therefore, it is possible to carry out the downstream and upstream communications in parallel.

In the downstream communication, the OLT 301 receives IP packets addressed to the ONUs 305-1, ..., 305-n from a host network 311. Then, the OLT 301 generates time division multiplexed downstream signals from these IP packets. The downstream signal may contain communication data D1, ..., Dn addressed to each of the ONUs 305-1, ..., 305-n. This downstream signal is outputted from the OLT 301 and arrives at the splitter 302 via the optical fiber 303. The splitter 302 outputs the same downstream signal to each of the optical fibers 304-1, ..., 304-n. Receiving the downstream signal from the corresponding optical fibers 304-1, ..., 304-n, the ONUs 305-1, ..., 305-n extract the IP packets D1, ..., Dn addressed to own, to convert into communication data and sends to corresponding communication terminals 312 (e.g., a personal computer, an IP telephone and the like). It is noted that the OLT 301 transmits the communication data D1, ..., Dn by encrypting them in order to assure confidentiality of the communication (i.e., so that the ONUs other than the addressed ONU cannot decode the communication data D1, ..., Dn).

On the other hand, during the upstream communication, the ONUs 305-1, ..., 305-n receive communication data U1, ..., Un from the corresponding communication terminals 312. The communication data U1, ..., Un are outputted at timing set per each ONU 305-1, ..., 305-N. The communication data U1, ..., Un arrive at the splitter 302 via the optical fibers 304-1, ..., 304-n. The splitter 302 superimposes the communication data U1, ..., Un as they are. At this time, a multiplexed upstream signal may be generated by adequately setting the timing for outputting the communication data U1, ..., Un from each of the ONUs 305-1, ..., 305-n, because the splitter 302 superimposes the communication data. The upstream signal is outputted from the splitter 302 and arrives at the OLT 301 via the optical fiber 303. The OLT 301 multiplies and separates the upstream signal to generate IP packets and sends them to the host network 311.

In order for the splitter 302 to multiply the upstream signal in the time-division manner as described above, it is necessary to coordinate the output timing of the communication data U1, ..., Un per each of the ONUs 305-1, ..., 305-n. Here, a distance from the ONUs 305-1, ..., 305-n to the splitter 302 differ per each of the ONUs 305-1, ..., 305-n. Therefore, a delay time (signal propagating time) from the ONUs 305-1, ..., 305-n to the splitter 302 also differs from each other. Therefore, it is necessary to take the difference of the delay times into account in coordinating the signal output timing of each of the ONUs 305-1, ..., 305-n in order to carry out the time-division multiplication by the splitter 302. For such reason, it is necessary to precisely measure the delay time from each of the ONUs 305-1, ..., 305-n to the splitter 302 in the PON.

Figure 4:
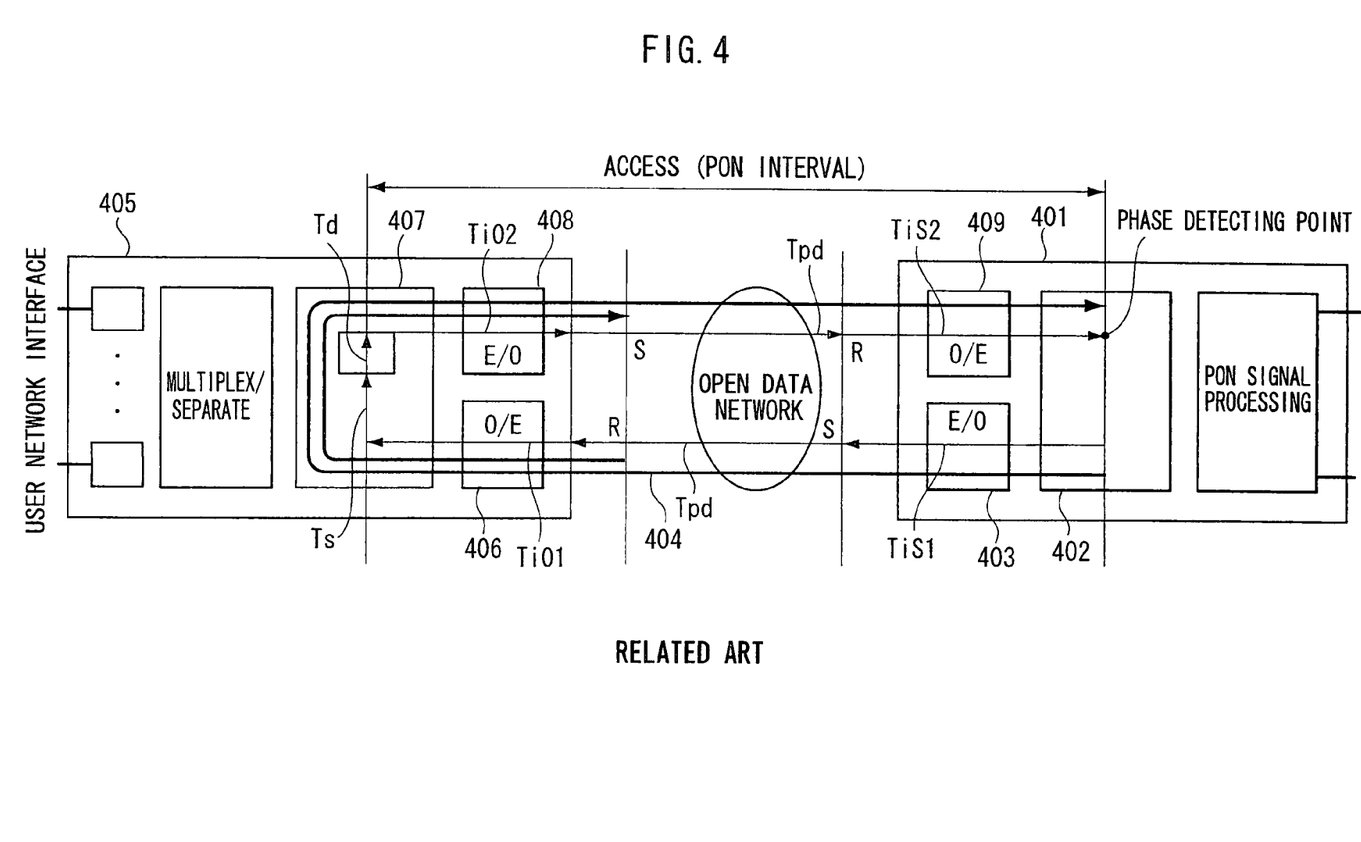
FIG. 4 is a conceptual diagram for explaining a ranging method stipulated by ITU-T Recommendation G.983.1.

As a method for measuring such a delay time, there has been known a method called as ranging. As a ranging system, there is a system stipulated in ITU-T Recommendation G.983.1 for example (see "ITU-T Recommendation" issued by International Telecommunications Union, January 2005, p. 72, FIG. 25/G983.1-Configuration of the specification points). FIG. 4 is a conceptual diagram for explaining this method and is substantially the same diagram with FIG. 25 in ITU-T Recommendation G.983.1.

In the technology shown in FIG. 4, a processing circuit 402 of the OLT 401 generates and outputs an electrical signal for measuring the delay (referred to as a "ranging signal" hereinafter) at first. The ranging signal is converted into an optical signal by an electrical/optical converter 403 and is sent to an ONU 405 via an optical communication line 404. The inputted ranging signal is converted into an electrical signal by an optical/electrical converter 406 and is inputted to a processing circuit 407. The processing circuit 407 transfers this ranging signal to an electrical/optical converter 408. This ranging signal is then converted again into an optical signal by the electrical/optical converter 408 and is returned to the OLT 401. It is converted into an electrical signal again by an optical/electrical converter 409 and is inputted to the processing circuit 402. The processing circuit 402 measures an elapsed time Tconst from the output to the input of the ranging signal by using a built-in timer not shown.

Here, a delay time when the ranging signal passes through the optical communication line 404 in the downstream direction is the same with that in the upstream direction, such delay time will be defined as Tpd, respectively. Delay times in passing through the converters 403, 406, 408 and 409 will be defined as TiS1, TiO1, TiO2 and TiS2, a delay time when the processing circuit 407 transfers the ranging signal from the optical/electrical converter 406 to the electrical/optical converter 408 will be defined as Ts and an equalized delay time of the processing circuit 407 (i.e., a transmission delay time between the OLT through the ONU) will be defined as Td. Here, TiS1 and TiS2 may be measured or set independently. A sum Tresponce of TiO1, Ts, Td and TiO2 is also measurable. Accordingly, it is possible to obtain the delay time Tpd from Tconst by the following expressions (1a) and (1b):

$$Tconst = TiS1 + Tpd + TiO1 + Ts + Td + TiO2 + Tpd + TiS2 \quad (1a)$$
$$= 2 \times Tpd + Tresponse + TiS1 + TiS2$$

$$Tresponse = TiO1 + Ts + Td + TiO2 \quad (1b)$$
$$(\text{when } Td = 0, Tresponse = TiO1 + Ts + TiO2)$$

The splitter 302 can generate the time-division multiplexed upstream signal by finding the delay time Tpd of each of the ONUs 305-1, . . . , 305-n (see FIG. 3) through the procedure described above and by coordinating the output timing of the ONUs 305-1, . . . , 305-n.

As shown in FIG. 3, one OLT 301 can accommodate plural numbers of ONUs 305-1, . . . , 305n in the PON and can additionally accommodate ONUs after initiating the operation of the PON. It is necessary to carry out the ranging as described above for the ONU newly accommodated, when adding the ONU. Beside the case of accommodating the new ONU, there is a case when the ranging needs to be carried out while the PON is in-service. When the ranging of either one ONU is being carried out, the other ONUs are required to stop the upstream communication. It is because reliability of the upstream signal of the other ONUs cannot be guaranteed since the upstream communication of the ranging signal is carried out even though its delay time (see FIG. 4) is not specified, and there is a possibility that the ranging signal collides with the upstream signal of the other ONUs. Therefore, ITU-T Recommendation G.983 and G984 stipulate that the other ONUs should not transmit upstream signals during a ranging period (i.e., a ranging window).

Figure 5A:
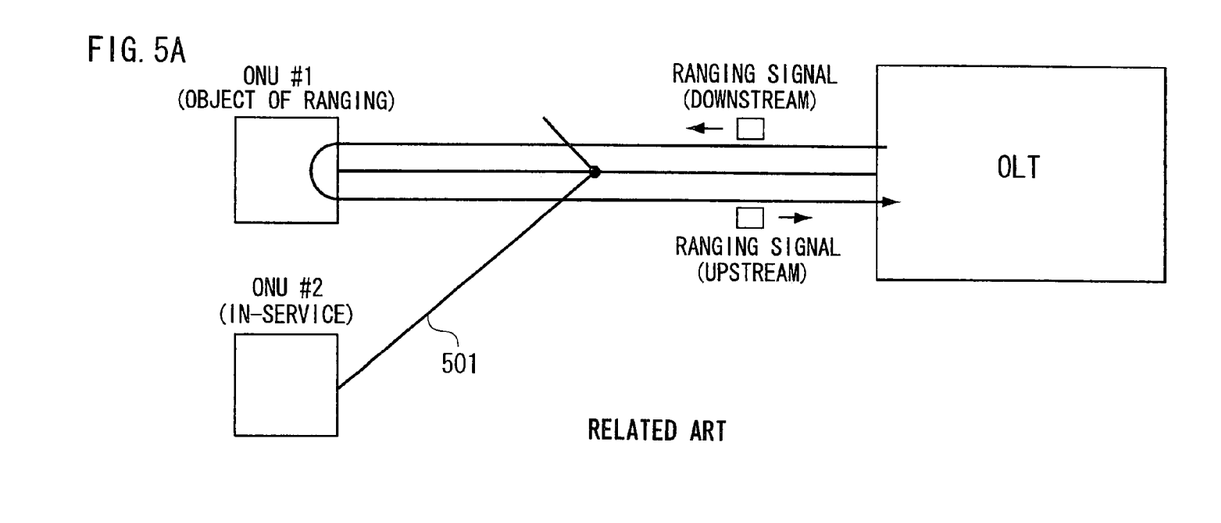
FIG. 5A is a conceptual diagram for explaining a ranging operation in the PON.
Figure 5B:
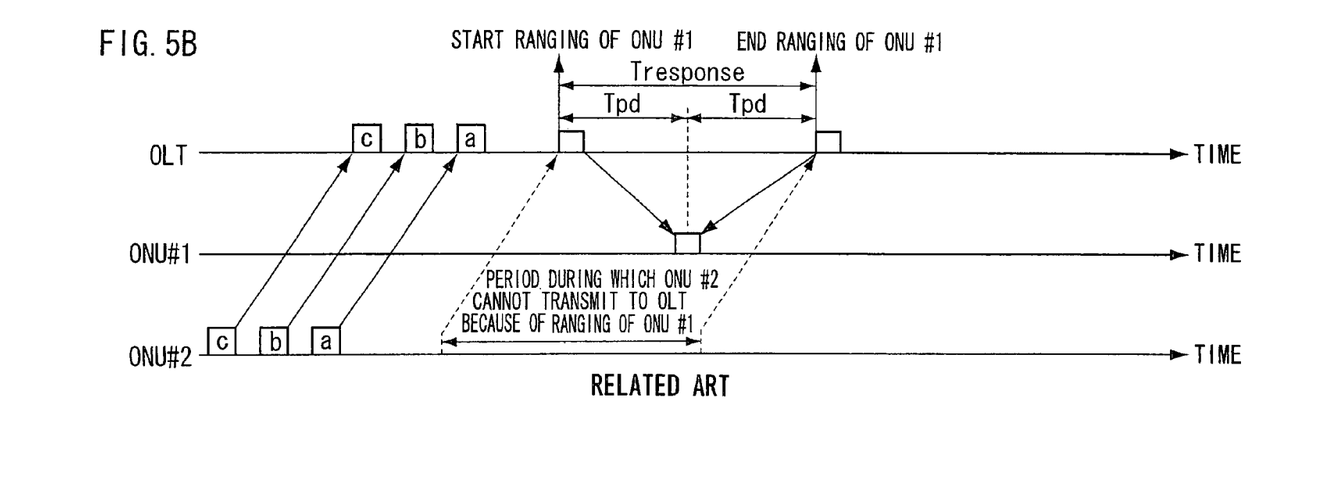
FIG. 5B is a conceptual diagram for explaining the ranging operation in the PON.

FIGS. 5A and 5B are conceptual diagrams for explaining the ranging operation in the PON. FIG. 5A is a conceptual diagram showing a configuration of the PON and FIG. 5B is a conceptual diagram showing the operation. The splitter and others are omitted in FIG. 5A. FIGS. 5A and 5B show a case when the ranging of the ONU #1 is carried out during when a communication is made between the OLT and the ONU #2 via an optical communication line 501. In this case, it is unable to guarantee the reliability of the upstream communication of the ONU #2 as described above. Therefore, the upstream communication of the ONU #2 is forbidden from the beginning to the end of ranging of the ONU #1 (i.e., from when the OLT transmitted the ranging signal until when it receives the ranging signal). The communication between the OLT and the ONU #2 is started again when the ranging ends (see a, b and c in FIG. 5B).

However, it is not desirable to disrupt the service of the ONU for the ranging from a point of view of assuring quality and reliability of the service. Therefore, it has been desired to provide a countermeasure for carrying out the ranging without disrupting the service to the other ONU.

Figure 6:
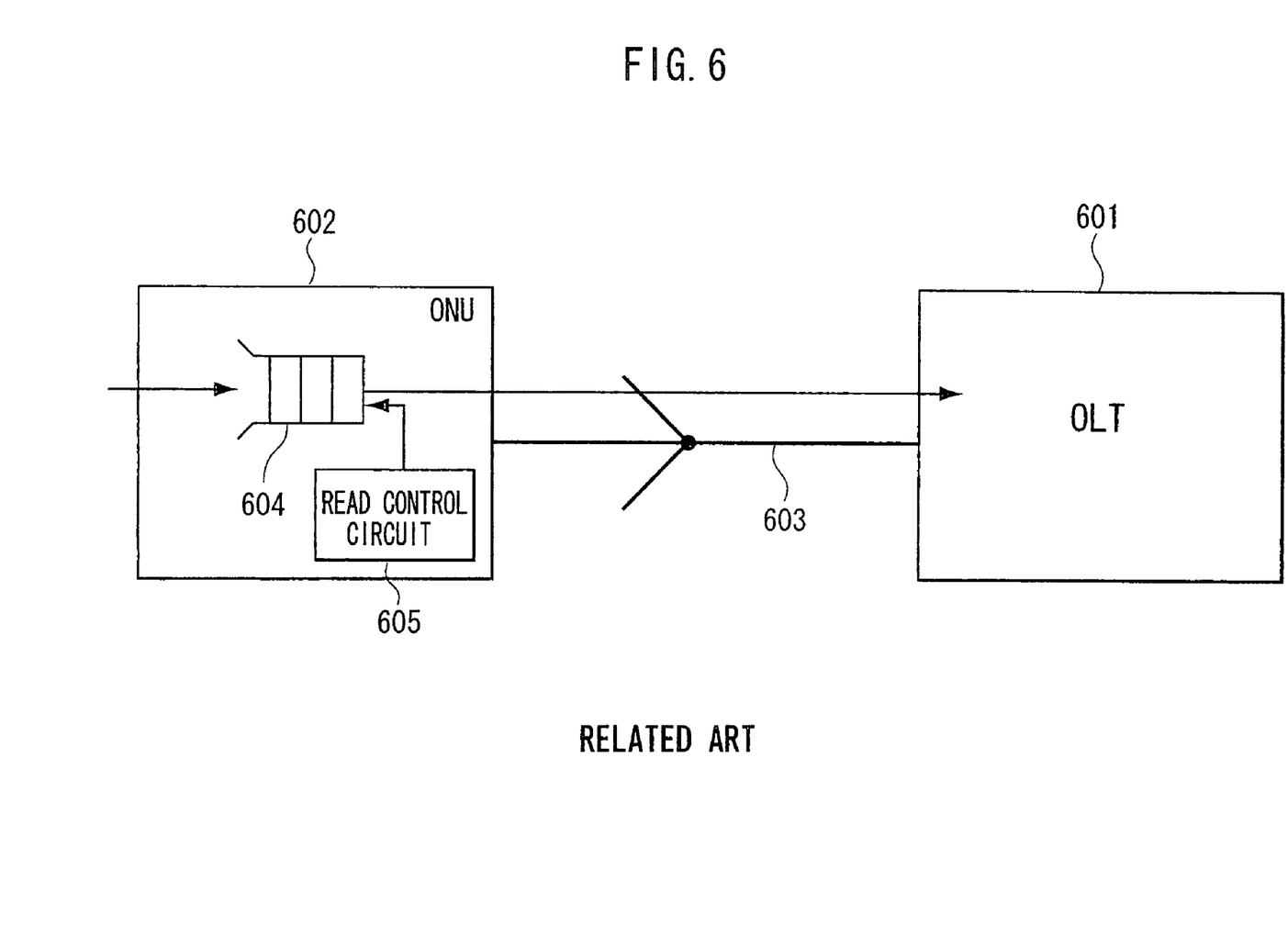
FIG. 6 is a conceptual diagram showing an exemplary configuration of a conventional art PON system.

As a countermeasure for that, there has been a method of providing a buffer on the side of the ONU to temporarily accumulate upstream signals. FIG. 6 is a conceptual diagram showing a case when the buffer is provided in the ONU. As shown in FIG. 6, signals outputted out of a communication terminal are accumulated once in the buffer 604 within the buffer 604. The signals accumulated in the buffer 604 are outputted with timing specified by a read control circuit 605 and arrive at the OLT 601 via an optical communication cable 603.

Figure 7A:
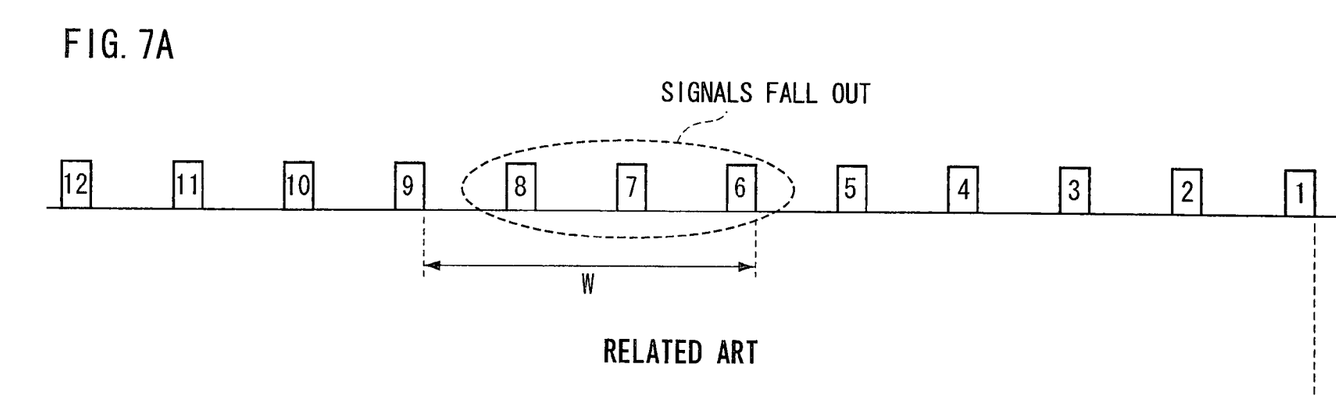
FIG. 7A is a conceptual diagram showing an exemplary operation of the conventional art PON system.

When no buffer is provided in the ONU, the object ONU of ranging operates as shown in FIG. 7A. That is, this ONU cannot transmit upstream signals inputted from the communication terminal to the OLT during a period corresponding to the ranging window W. Therefore, the upstream signals fall out.

Figure 7B:
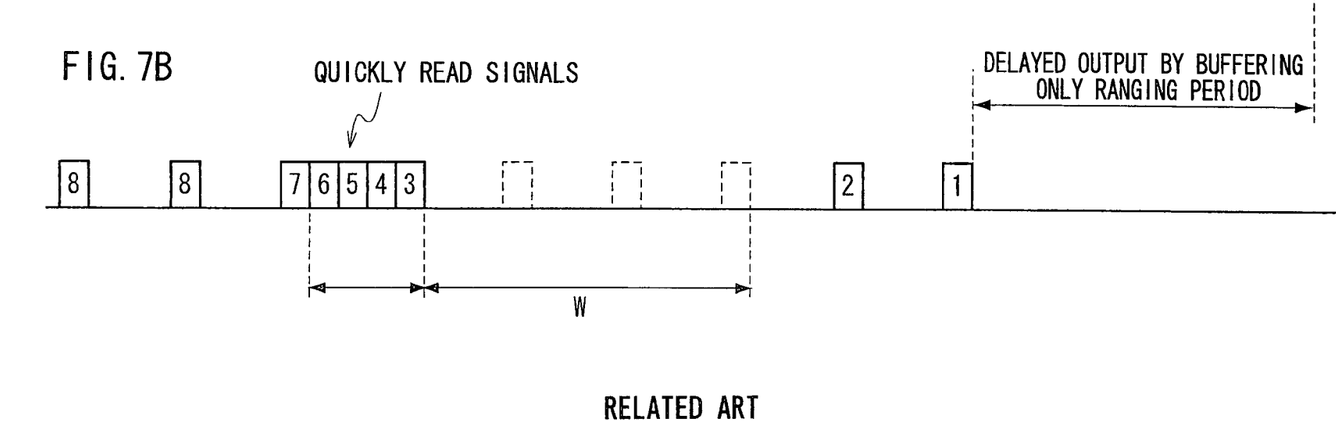
FIG. 7B is a conceptual diagram showing an exemplary operation of the conventional art PON system.

When the buffer is provided in the ONU, the ONU that is not the object of ranging operates as shown in FIG. 7B. The upstream signals inputted from the communication terminal are accumulated once in the buffer and are outputted sequentially with the timing specified by the read control circuit (see FIG. 6). Accordingly, the timing for outputting each upstream signal of the ONU becomes late as compared to the case of FIG. 7A even before the ranging window W is initiated. When the ranging window W is initiated, the read control circuit stops to read the accumulated upstream signals. Therefore, a number of upstream signals accumulated in the buffer increases. After that, when the ranging window W ends, the read control circuit quickly and sequentially reads the upstream signals accumulated in the buffer to output from the ONU.

However, the method of using the buffer leads to an increase of cost of the PON since the required buffer capacity is large. The larger the number of ONUs accommodated in one OLT, the larger the required buffer capacity becomes. Further, the larger the number of splits of the optical communication line (i.e., a number of the splitters) and the larger the transmission band, the larger the buffer capacity becomes.

In addition to that, because the upstream signals need to be quickly read and transmitted when the buffer is provided on the side of the ONU, a high precision and complex control is required.

SUMMARY OF THE INVENTION

The present invention provides a low-cost optical access system that can continue services during the ranging window with simple controls and at a low cost.

According to a first aspect of the invention, an optical access system including, a station unit having a working system station interface and an auxiliary system station interface, an optical communication cable having a working system transmission line connected to the working system station interface and an auxiliary system transmission line connected to the auxiliary system station interface, a terminal access unit having a working system terminal interface connected to the working system transmission line and an auxiliary system terminal interface connected to the auxiliary system transmission line, a first ranging signal generator that generates a first ranging signal that outputs from the working system station interface to the working system transmission line, a first loop circuit that transfers the first ranging signal received by the working system terminal interface from the working system transmission line to the auxiliary system terminal interface, a second loop circuit that transfers the first ranging signal, which is received by the auxiliary system station interface from the auxiliary system terminal interface via the auxiliary system transmission line, to the working system station interface, a first checker that checks a time from when the working system station interface transmits the first ranging signal until the working system station interface receives the first ranging signal, a second ranging signal generator that generates a second ranging signal that outputs from the auxiliary system station interface to the auxiliary system transmission line, a third loop circuit that outputs the second ranging signal, which is received by the auxiliary system terminal interface from the auxiliary system transmission line, to the auxiliary system transmission line from the auxiliary system terminal interface, and a second checker that checks a time from when the auxiliary system station interface transmits the second ranging signal until the auxiliary system station interface receives the second ranging signal.

In the aspect described above, the station unit may include a working system common section and an auxiliary system common section that respectively mediate communication between the working system station interface and a host network, and the auxiliary system station interface and the host network, a first selector that selectively supplies a signal outputted from either one of the working system station interface or the auxiliary system station interface, to the working system common section or the auxiliary system common section, and a second selector that selectively supplies a signal outputted from either one of the working system common section or the auxiliary system common section, to the working system station interface or the auxiliary system station interface.

According to a second aspect of the invention, a ranging method of the optical access system including a station unit having a working system station interface and an auxiliary system station interface, an optical communication cable having a working system transmission line connected to the working system station interface and an auxiliary system transmission line connected to the auxiliary system station interface, and a terminal access unit having a working system terminal interface connected to the working system transmission line and an auxiliary system terminal interface connected to the auxiliary system transmission line, the ranging method including, a first step of generating a first ranging signal and outputting the first ranging signal from the working system station interface to the working system transmission line, a second step of transferring the first ranging signal received by the working system terminal interface from the working system transmission line, to the auxiliary system terminal interface, a third step of transferring the first ranging signal to the working system station interface via the auxiliary system terminal interface, the auxiliary system transmission line and the auxiliary system station interface, a fourth step of generating a second ranging signal and outputting the second ranging signal from the auxiliary system station interface to the auxiliary system transmission line, a fifth step of transferring the second ranging signal, which is received by the auxiliary system terminal interface via the auxiliary system transmission line, back to the auxiliary system station interface from the auxiliary system terminal interface, via the auxiliary system transmission line, and a sixth step of computing a delay time of the working system transmission line based on a time from when the working system station interface transmits the first ranging signal until the working system station interface receives the first ranging signal, and a time from when the auxiliary system station interface transmits the second ranging signal until the auxiliary system station interface receives the second ranging signal.

According to the above-mentioned aspects, the working (actually-used) system transmission line is used for the downstream communication (communication from the station side to the terminal interface side) and the auxiliary system transmission line is used for the upstream communication (communication from the terminal interface side to the station side) during ranging. Here, because the station unit performs time-divided multiplexing for the downstream communication, there is no possibility of causing collision of signals. Further, the auxiliary system transmission line is used for the ranging signals, i.e., the first and second ranging signals, there is also no possibility that they collide with signals transmitted from other access terminals. Therefore, the invention can prevent the disruption of services during a ranging window at low cost without involving complicated control.

BRIEF DESCRIPTION OF THE DRAWINGS

Exemplary embodiments of the present invention will be described in detail based on the following figures, wherein.

DETAILED DESCRIPTION OF THE INVENTION

An embodiment of an optical access system of the invention will be explained below by exemplifying a case when the invention is applied to a PON system and by using FIGS. 1 and 2. It is noted that size, shape and disposition of each component are schematically shown only to a degree of helping to understand the invention and numerical conditions explained below are merely examples.

Figure 1:
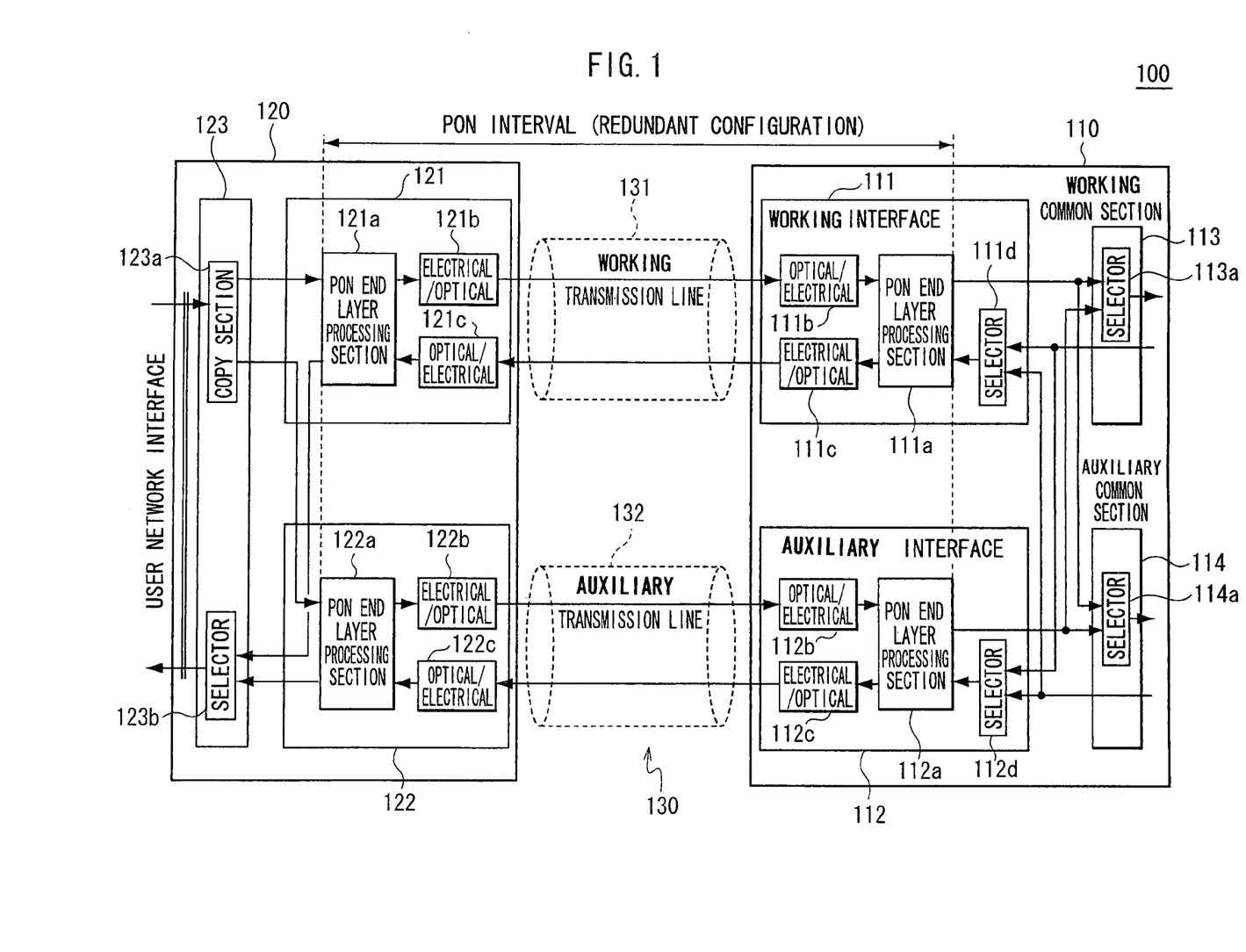
FIG. 1 is block diagram schematically showing a redundant configuration of a PON system of an embodiment.

FIG. 1 is block diagram schematically showing a redundant configuration of a PON system of the embodiment. As shown in FIG. 1, the PON system 100 of the embodiment includes an OLT 110, an ONU 120 and an optical communication cable 130.

The OLT 110 includes a working system interface 111 and an auxiliary system interface 112, a working system common section 113 and an auxiliary system common section 114.

The working system interface 111 communicates with a working system interface 121 of the ONU 120 via a working system transmission line 131 (described later). The working system interface 111 includes a PON end layer processing section 111*a*, an optical/electrical converter 111*b*, an electrical/optical converter 111*c* and a selector 111*d*.

The PON end layer processing section 111*a* performs signal processing for making PON communication in the same manner with the conventional art and processing of the ranging of the embodiment. An internal structure and operation of the PON end layer processing section 111*a* will be described later.

The optical/electrical converter 111*b* converts an optical signal inputted from the working system transmission line 131 into an electrical signal to output to the PON end layer processing section 111*a*.

The electrical/optical converter 111*c* converts the electrical signal inputted from the PON end layer processing section 111*a* into an optical signal to output to the transmission line 131.

The selector 111*d* selects either one of the working system common section 113 or the auxiliary system common section 114 and sends an output signal of the selected common section to the PON end layer processing section 111a.

The auxiliary system interface 112 communicates with an auxiliary system interface 122 of the ONU 120 via an auxiliary system transmission line 132 (described later). The auxiliary system interface 112 includes a PON end layer processing section 112a, an optical/electrical converter 112b, an electrical/optical converter 112c and a selector 112d.

The PON end layer processing section 112a performs processing related to the ranging of the present embodiment. An internal structure and operation of the PON end layer processing section 112a will be described later.

The optical/electrical converter 112b converts an optical signal inputted from the auxiliary system transmission line 132 into an electrical signal to output to the PON end layer processing section 112a.

The electrical/optical converter 112c converts the electrical signal inputted from the PON end layer processing section 111a into an optical signal to output to the transmission line 132.

The selector 112d selectively sends an output signal of the common section 113 or 114 to the PON end layer processing section 112a.

The working system common section 113 intermediates communication of the interfaces 111 and 112 with the host network. The working system common section 113 includes a selector 113a. The selector 113a selectively sends the output signal of the interfaces 111 and 112 to an outside network.

The auxiliary system common section 114 intermediates communication of the interfaces 111 and 112 with the host network. The auxiliary system common section 114 includes a selector 114a. The selector 114a selectively sends the output signals of the interfaces 111 and 112 to the outside network.

The ONU 120 includes a working system interface 121, an auxiliary system interface 122 and a common section 123.

The working system interface 121 communicates with the working system interface 111 of the OLT 110 via the working system transmission line 131. The working system interface 121 includes a PON end layer processing section 121a, an electrical/optical converter 121b and an optical/electrical converter 121c.

The PON end layer processing section 121a performs signal processing for PON communications in the same manner with the conventional art and processing related to ranging of the embodiment. An internal structure and operation of the PON end layer processing section 121a will be described later.

The electrical/optical converter 121b converts an electrical signal inputted from the PON end layer processing section 121a into an optical signal to output to the working system transmission line 131.

The optical/electrical converter 121c converts an optical signal inputted from the working system transmission line 131 into an electrical signal to output to the PON end layer processing section 121a.

The auxiliary system interface 122 communicates with the auxiliary system interface 112 of the OLT 110 via the auxiliary system transmission line 132. The auxiliary system interface 122 includes a PON end layer processing section 122a, an electrical/optical converter 122b and an optical/electrical converter 122c.

The PON end layer processing section 122a performs processing related to ranging of the embodiment. An internal structure and operation of the PON end layer processing section 122a will be described later.

The electrical/optical converter 122b converts an electrical signal inputted from the PON end layer processing section 122a into an optical signal to output to the auxiliary system transmission line 132.

The optical/electrical converter 122c converts an optical signal inputted from the auxiliary system transmission line 132 into an electrical signal to output to the PON end layer processing section 122a.

The common section 123 intermediates communication of the interfaces 121 and 122 with the communication terminal. The common section 123 is connected with the communication terminal via UNI (User Network Interface). The common section 123 includes a copying section 123a and a selector 123b. The copying section 123a copies a signal inputted from the communication terminal and sends a totally same signal to the PON end layer processing sections 121a and 122a of the respective interfaces 121 and 122. The selector 123b selectively sends an output signal of the PON end layer processing sections 121a and 122a.

The optical communication cable 130 has the working system transmission line 131 and the auxiliary system transmission line 132. The working system transmission line 131, as described above, connects the communication of the working system interface 111 of the OLT 110 with the working system interface 121 of the ONU 120. Further, the auxiliary system transmission line 132 connects the communication of the auxiliary system interface 112 of the OLT 110 with the auxiliary system interface 122 of the ONU 120.

Although loop circuits are formed respectively within the OLT 110 and the ONU 120 in the present embodiment, as described later, they are omitted in FIG. 1 (see FIG. 2).

Figure 2:
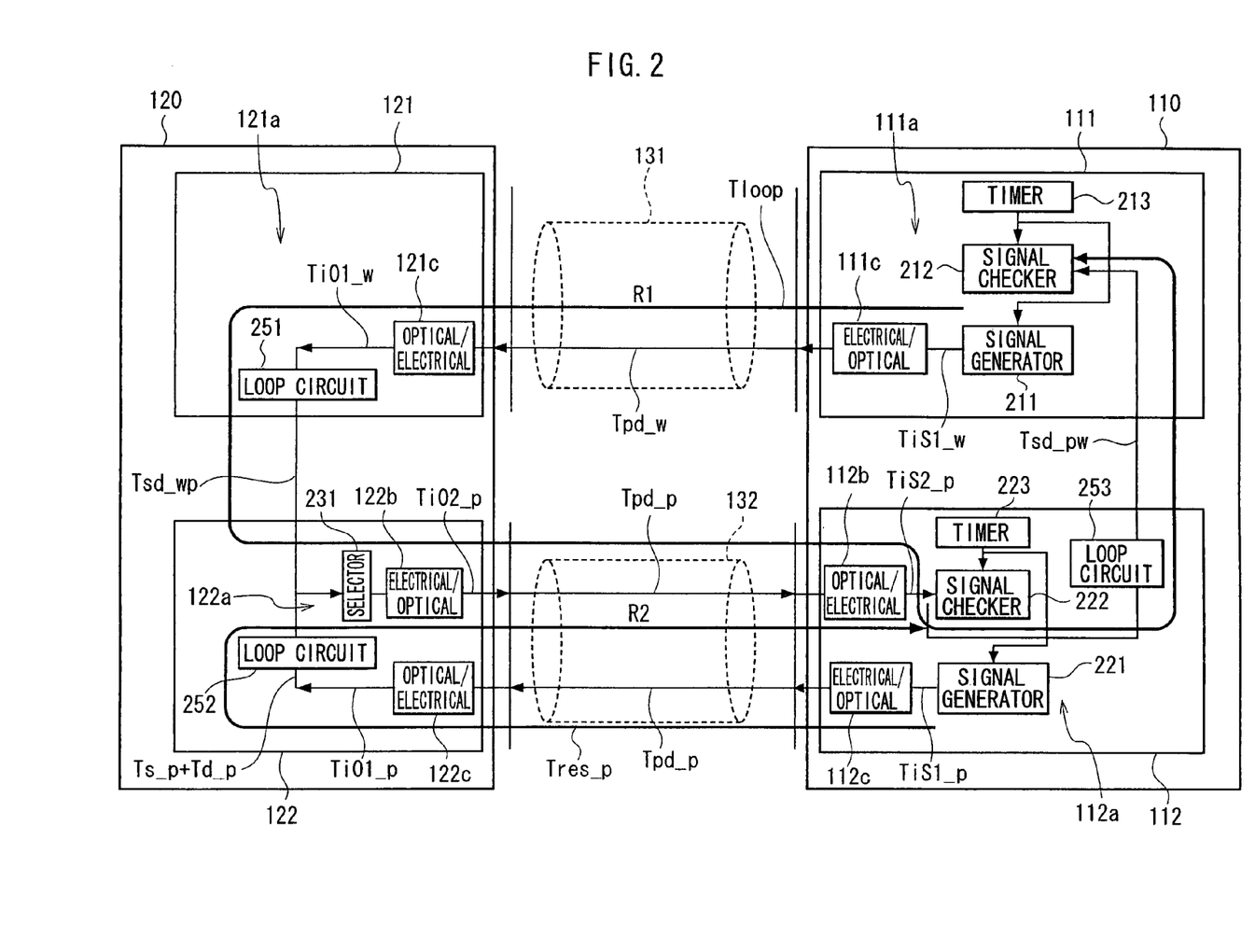
FIG. 2 is a block diagram schematically showing a functional configuration of the PON system of the embodiment.

FIG. 2 is a block diagram schematically showing a functional configuration of the PON system of the embodiment. Each of the constituent elements of FIG. 2 with the same reference numbers as FIG. 1 indicate the same features as those of FIG. 1.

As shown in FIG. 2, a signal generator 211, a signal checker 212 and a timer 213 are functionally configured in the PON end layer processing section 111a. The signal generator 211 generates a ranging signal R1 and sends the ranging signal R1 to the electrical/optical converter 111c. The signal checker 212 inputs the ranging signal R1 from the loop circuit 253 (described later). The signal checker 212 also checks a time required from when the ranging signal R1 was transmitted by the signal generator 211 until when the ranging signal R1 arrives at the signal checker 212 by using the timer 213. The timer 213 counts the time under the control of the signal checker 212.

In the PON end layer processing section 112a, a signal generator 221, a signal checker 222 and a timer 223 are functionally configured. The signal generator 221 generates a ranging signal R2 and sends the ranging signal R2 to the electrical/optical converter 112c. The signal checker 222 inputs the ranging signal R2 from the optical/electrical converter 112b. The signal checker 222 also checks a time required from when the ranging signal R2 was transmitted by the signal generator 221 until when the ranging signal R2 arrives at the signal checker 222 by using the timer 223. The timer 223 counts the time under the control of the signal checker 222. When the ranging signal R1 is inputted from the optical/electrical converter 112b, the PON end layer processing section 112a transfers this ranging signal R1 to the loop circuit 253.

The PON end layer processing section 121a transfers the ranging signal R1 inputted from the optical/electrical converter 121c to the loop circuit 251.

A selector 231 is functionally configured in the PON end layer processing section 122a. The selector 231 sends the ranging signals R1 and R2 inputted from the loop circuits 251 and 252 to the electrical/optical converter 122b. The PON end layer processing section 122a sends the ranging signal R2 inputted from the optical/electrical converter 122c to the loop circuit 252.

The loop circuit 251 is a circuit for transferring the ranging signal R1 outputted out of the optical/electrical converter 121c to the electrical/optical converter 122b.

The loop circuit 252 is a circuit for transferring the ranging signal R2 outputted out of the optical/electrical converter 122c to the electrical/optical converter 122b.

The loop circuit 253 is a circuit for transferring the ranging signal R1 outputted out of the optical/electrical converter 112b to the signal checker 212.

Next, the operation of the PON system of the present embodiment will be explained.

In the beginning, the PON system measures the signal delay time Tloop by using the ranging signal R1 as follows.

At first, the PON end layer processing section 111a, i.e., the PON end layer processing section 111a provided in the working system interface 111 of the OLT 110, generates the ranging signal R1. The signal generator 211 generates the ranging signal R1 as described above. When the ranging signal R1 is outputted, the signal checker 212 memorizes that time indicated by the timer 213.

The ranging signal R1 is converted into an optical signal by the electrical/optical converter 111c and is outputted to the working system transmission line 131. As described above, the optical signal transmitted from the OLT 110 to the ONU 120 is multiplexed in the time-division manner within the OLT 110 so that the ranging signal R1 will not collide with optical signals directed to another ONU (not shown).

The optical signals outputted to the working system transmission line 131 (i.e., the time-divided multiplexed signals including the ranging signal R1) passes through the splitter (not shown in FIGS. 1 and 2. See FIG. 3) and reaches to the ONU 120. The optical/electrical converter 121c of the ONU 120 converts the optical signals into electrical signals and sends them to the PON end layer processing section 121a. The PON end layer processing section 121a extracts the ranging signal R1 from the electrical signals and outputs the ranging signal R1 to the loop circuit 251.

The ranging signal R1 passes through the loop circuit 251 and the selector 231 and reaches to the electrical/optical converter 122b. The electrical/optical converter 122b converts the ranging signal R1 into an optical signal and outputs the ranging signal R1 to the auxiliary system transmission line 132. Because the auxiliary system transmission line 132 is not used for upstream communications of the other ONUs, the ranging signal R1 will cause no collision nor destruction.

The ranging signal R1 passes through the auxiliary system transmission line 132 and reaches to the optical/electrical converter 112b. The ranging signal R1 is converted into an electrical signal by the optical/electrical converter 112b and is received by the signal checker 212 within the PON end layer processing section 111a via the PON end layer processing section 112a and the loop circuit 253.

The signal checker 212 memorizes the ranging signal R1 receiving time by reading from the timer 213. Then, the signal checker 212 compares the ranging signal R1 receiving time with the time when the signal generator 211 outputted the ranging signal R1 to calculate a whole signal delay time Tloop. Tloop may be expressed by the following expression (2). In the expression (2), TiS1_w is a delay time from the signal generator 211 to an input end of the working system transmission line 131, Tpd_w is a delay time of the working system transmission line 131, TiO1_w is a delay time from an output end of the working system transmission line 131 to an input end of the loop circuit 251, Tsd_wp is a delay time of the loop circuit 251, TiO2_p is a delay time from the selector 231 to an input end of the auxiliary system transmission line 132, Tpd_p is a delay time of the auxiliary system transmission line 132, TiS2_p is a delay time from an output end of the auxiliary system transmission line 132 to the signal checker 222 and Tsd_pw is a delay time of the loop circuit 253.

$$Tloop = TiS1\_w + Tpd\_w + TiO1\_w + Tsd\_wp + TiO2\_p + Tpd\_p + TiS2\_p + Tsd\_pw \quad (2)$$

Next, the PON system measures a signal delay time Tres_p by using the ranging signal R2 as follows.

At first, the PON end layer processing section 112a, i.e., the PON end layer processing section 112a provided in the auxiliary system interface 112 of the OLT 110, generates the ranging signal R2. The signal generator 221 generates the ranging signal R2 as described above. When the ranging signal R2 is outputted, the signal checker 222 memorizes that time indicated by the timer 223.

The ranging signal R2 is converted into an optical signal by the electrical/optical converter 112c and is outputted to the auxiliary system transmission line 132. Because the auxiliary system transmission line 132 is not used by the other ONUs as described above, the ranging signal R2 will not collide with other signals.

The ranging signal R2 outputted to the auxiliary system transmission line 132 passes through the splitter (not shown) and reaches to the ONU 120. The optical/electrical converter 122c of the ONU 120 converts the ranging signal R2 into an electrical signal and sends the ranging signal R2 to the PON end layer processing section 122a. The PON end layer processing section 122a outputs the ranging signal R2 to the loop circuit 252.

The ranging signal R2 passes through the loop circuit 252 and the selector 231 and reaches to the electrical/optical converter 122b. The electrical/optical converter 122b converts the ranging signal R2 into an optical signal and outputs the ranging signal R2 to the auxiliary system transmission line 132. At this time too, the ranging signal R2 will not cause any collision or destruction.

The ranging signal R2 passes through the auxiliary system transmission line 132 and reaches to the optical/electrical converter 112b. The ranging signal R2 is converted into an electrical signal by the optical/electrical converter 112b and is received by the signal checker 222.

The signal checker 222 memorizes the ranging signal R2 receiving time by reading from the timer 223. Then, the signal checker 222 compares the ranging signal R2 receiving time with the time when the signal generator 221 outputted the ranging signal R2 to calculate a whole signal delay time Tres_p. Tres_p may be expressed by the following expression (3). In the expression (3), TiS1_w is a delay time from the signal generator 221 to an input end of the auxiliary system transmission line 132, Tpd_p is a delay time of the auxiliary system transmission line 132, TiO1_p is a delay time from an output end of the auxiliary system transmission line 132 to an input end of the loop circuit 252, Ts_P+Td_p is a sum of a delay time of the loop circuit 252 and an equalized delay time, TiO2_p is a delay time from the selector 231 to the input end of the auxiliary system transmission line 132, Tpd_p is a delay time of the auxiliary system transmission line 132 and TiS2_p is a delay time from the output end of the auxiliary system transmission line 132 to the signal checker 222.

$$Tres\_p = TiS1\_p + Tpd\_p + TiO1_{13}p + Ts\_p + Td\_p + TiO2\_p + Tpd\_p + TiS2\_p \quad (3)$$

The Tpd_w of the working system transmission line 131 may be expressed from the expressions (2) and (3) by the following expression (4):

$$Tpd\_w = Tloop - Tres\_p + Tpd\_p - (TiS1\_w + TiO1\_w) - (Tsd\_wp + Tsd\_pw) + TiS1\_p + TiO1\_p + Ts\_p + Td\_p \quad (4)$$

Here, the delay time Tpd_p is a delay time of the auxiliary system transmission line. Therefore, the delay time Tpd_p can be measured by using the same method with the conventional art without disrupting the operations of the working system interfaces 111 and 121.

The delay times TiSi_w and TiO1_w can be calculated while designing the device. Therefore, the delay times TiSi_w and TiO1_w can be handled as known values.

The delay times Tsd_wp and Tsd_pw can be calculated while designing the device or may be measured without disrupting the operations of the working system interfaces 111 and 121. Therefore, the delay times Tsd_wp and Tsd_pw can be handled as known values.

Because the delay times TiS1_p, TiO1_p, Ts_p and Td_p can be calculated while designing the unit, the delay times TiS1_p, TiO1_p, Ts_p and Td_p can be handled as known values.

Accordingly, it is possible to calculate the delay time Tpd_w by measuring the delay times Tloop and Tres_p.

As described above, according to the present embodiment, the auxiliary system transmission line 132 is used for the upstream communication in ranging (i.e., the communication of sending the ranging signal R1 from the ONU 120 to the OLT 110), so that the ranging signal R1 will not collide with upstream communication signals of the other ONUs. Therefore, according to the present embodiment, it is not necessary to disrupt the service of the other ONUs during ranging.

Further, according to the present embodiment, a buffer to prevent disruption of the service of the other ONUs is not necessary, and the increase of the scale of the circuit can be suppressed. Therefore, increases in the cost of the system can be suppressed. Further, a traffic control may be simplified by not using the buffer.

Thus, the ranging of the ONU 120 may be performed even when another ONUs are in-service by using the interfaces 112 and 122 and the transmission line 132, when each component (the interfaces 111 and 121 and the transmission line 131) of the working system is totally the same with each component (the interfaces 112 and 122 and the transmission line 132) of the auxiliary system.

What is claimed is:

1. An optical access system, comprising:

a station unit having a working system station interface and an auxiliary system station interface;

an optical communication cable having a working system transmission line connected to the working system station interface and an auxiliary system transmission line connected to the auxiliary system station interface;

a terminal access unit having a working system terminal interface connected to the working system transmission line and an auxiliary system terminal interface connected to the auxiliary system transmission line;

a first ranging signal generator that generates a first ranging signal that outputs from the working system station interface to the working system transmission line;

a first loop circuit that transfers the first ranging signal received by the working system terminal interface from the working system transmission line to the auxiliary system terminal interface;

a second loop circuit that transfers the first ranging signal, which is received by the auxiliary system station interface from the auxiliary system terminal interface via the auxiliary system transmission line, to the working system station interface;

a first checker that checks a time from when the working system station interface transmits the first ranging signal until the working system station interface receives the first ranging signal;

a second ranging signal generator that generates a second ranging signal that outputs from the auxiliary system station interface to the auxiliary system transmission line;

a third loop circuit that outputs the second ranging signal, which is received by the auxiliary system terminal interface from the auxiliary system transmission line, to the auxiliary system transmission line from the auxiliary system terminal interface; and a second checker that checks a time from when the auxiliary system station interface transmits the second ranging signal until the auxiliary system station interface receives the second ranging signal.

2. The optical access system according to claim 1, wherein the station unit further comprises:

a working system common section and an auxiliary system common section that respectively mediate communication between the working system station interface and a host network, and the auxiliary system station interface and the host network;

a first selector that selectively supplies a signal outputted from either one of the working system station interface or the auxiliary system station interface, to the working system common section or the auxiliary system common section; and a second selector that selectively supplies a signal outputted from either one of the working system common section or the auxiliary system common section, to the working system station interface or the auxiliary system station interface.

3. The optical access system according to claim 1, wherein the working system station interface and the auxiliary system station interface have the same structure;

the working system transmission line and the auxiliary system transmission line have the same structure; and the working system terminal interface and the auxiliary system terminal interface have the same structure.

4. A ranging method of an optical access system comprising a station unit having a working system station interface and an auxiliary system station interface, an optical communication cable having a working system transmission line connected to the working system station interface and an auxiliary system transmission line connected to the auxiliary system station interface, and a terminal access unit having a working system terminal interface connected to the working system transmission line and an auxiliary system terminal interface connected to the auxiliary system transmission line, the ranging method comprising:

a first step of generating a first ranging signal and outputting the first ranging signal from the working system station interface to the working system transmission line;

a second step of transferring the first ranging signal received by the working system terminal interface from the working system transmission line, to the auxiliary system terminal interface;

a third step of transferring the first ranging signal to the working system station interface via the auxiliary system terminal interface, the auxiliary system transmission line and the auxiliary system station interface;

a fourth step of generating a second ranging signal and outputting the second ranging signal from the auxiliary system station interface to the auxiliary system transmission line;

a fifth step of transferring the second ranging signal, which is received by the auxiliary system terminal interface via the auxiliary system transmission line, back to the auxiliary system station interface from the auxiliary system terminal interface, via the auxiliary system transmission line; and a sixth step of computing a delay time of the working system transmission line based on a time from when the working system station interface transmits the first ranging signal until the working system station interface receives the first ranging signal, and a time from when the auxiliary system station interface transmits the second ranging signal until the auxiliary system station interface receives the second ranging signal.

5. The ranging method of the optical access system according to claim 4, wherein the working system station interface and the auxiliary system station interface have the same structure;

the working system transmission line and the auxiliary system transmission line have the same structure; and the working system terminal interface and the auxiliary system terminal interface have the same structure.

* * * * *